UNITED STATES PATENT OFFICE.

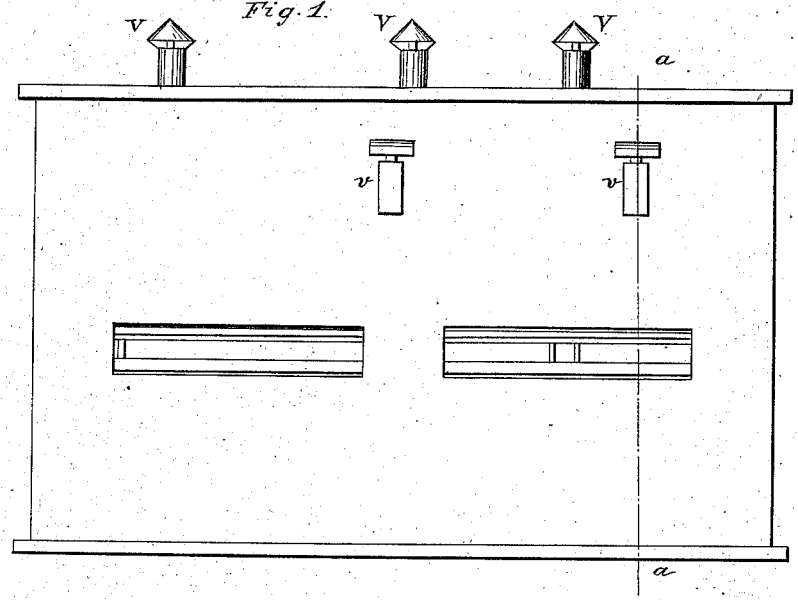
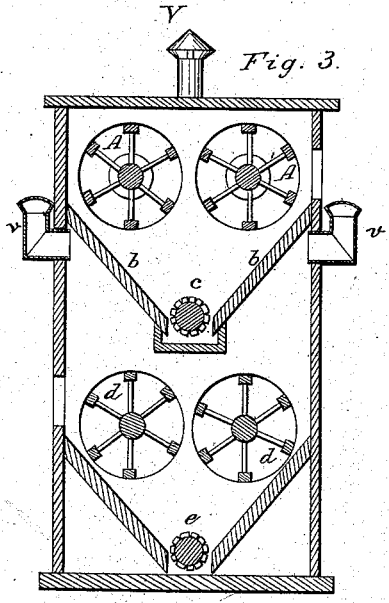
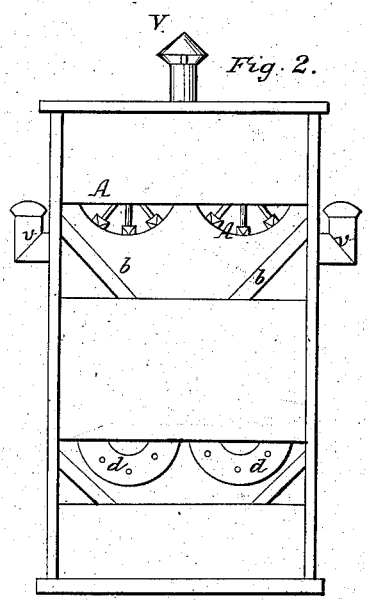

JOSEPH BELL, OF BELLEVILLE, ILLINOIS.

BOLTING-CHEST.

Specification of Letters Patent No. 31,947, dated April 9, 1861.

*To all whom it may concern:*

Be it known that I, JOSEPH BELL, of Belleville, in the county of St. Clair and State of Illinois, have invented a new and useful Improvement in Bolting-Chests; and I do hereby declare that the following is a full and clear description of the construction of the same, reference being had to the annexed drawings, making part of this specification.

Figure 1, is an external view of a bolting chest fitted with four reels and the ordinary appliances, and improved according to my invention. Fig. 2 is an end view of the same. Fig. 3 is a section on the line $a, a$.

It has hitherto been the practice in flour mills to pass the meal through coolers after it has left the stones and before bolting; and this has been required by the necessity for removing the steam and damp air which would otherwise occasion a deposit of dough on the bolting cloths and in other parts of the chest, to the deterioration of its efficiency and the depreciation of both the quantity and quality of the flour. Practical experience indicates that the sooner the meal passes from the mill stones to the bolts the better will be the result.

The improvement in bolting chests constituting my invention consists in providing the chest with ventilators by which the natural steam and dampness of the meal may be removed while in the chest without the intervention of special machinery. By this means the coolers may be dispensed with and the meal bolted immediately after leaving the stones; the chest is kept free from the dough which breeds worms and bugs, and turns sour and musty and damages the quality of the flour; the bolting cloths are protected from the rotting and clogging of the steam and damp dough which so soon prevents their doing one half the duty performed when they are free and clear, thus effecting an important economy not only in the flour but in the bolting cloths; and the flour is thoroughly cooled and dried for packing.

A, A are reels covered with bolting cloths. The meal is thrown into these reels at the end and the flour is sifted through upon the cant boards $b, b$, which guide it to the conveyer $c$. This conveyer delivers the flour to the head of the lower bolting reels $d, d$, by which it is again sifted and delivered to another conveyer $e$, that carries it out of the chest.

V, V, are the ventilators in the roof of the chest, and $v, v$, are those belonging to the lower pair of bolting reels. Both sets are placed in a high position that the steam may be taken without loss by the intermixture of flour dust. The most desirable position for the ventilators is indicated on the drawing, which merely represents the general construction of a bolting chest without including the details of gearing and cleaning doors which are not peculiar to my invention.

Now I am aware that bolting chests have been constructed in a variety of forms, and ventilated by introducing a blast of air into the bolting reels, thus forcing the flour along with the air through the bolting cloths. But all of them with which I am acquainted are complicated, expensive, and imperfect in their operation. The chief objection to them being found in the fact that small particles of bran, are forced by the blast through the bolting cloths, along with the flour, making it impure. To make the bolts work perfect, there should be no pressure, of blast, on either side of the cloths. A pressure on the outside would keep the flour from coming through. A pressure in the inside would force small particles of bran through with the flour. By my invention these objections are overcome as by its construction, the chest becomes very cheap and simple—the flour is cooled, and the operation of the bolts as near perfect as it is possible to make them.

What I claim therefore as my invention and desire to secure by Letters Patent, is—

The interior construction of the chest—shown and described—with the ventilators arranged therein, substantially as described for the purpose specified.

JOSEPH BELL.

Witnesses:
ROLLIN B. GRAY,
JAMES McHENRY.